A. VANBLOM.
SPRING TIRE.
APPLICATION FILED APR. 24, 1917.
1,241,453.
Patented Sept. 25, 1917.
2 SHEETS—SHEET 2.
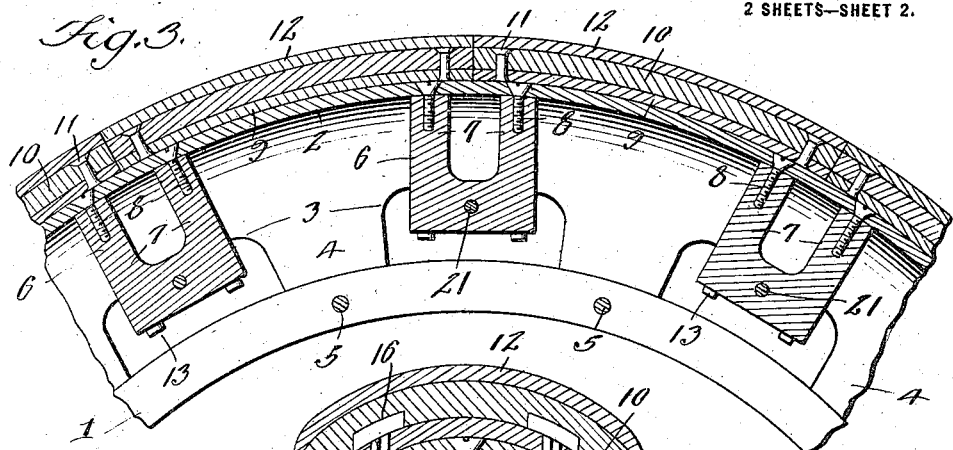
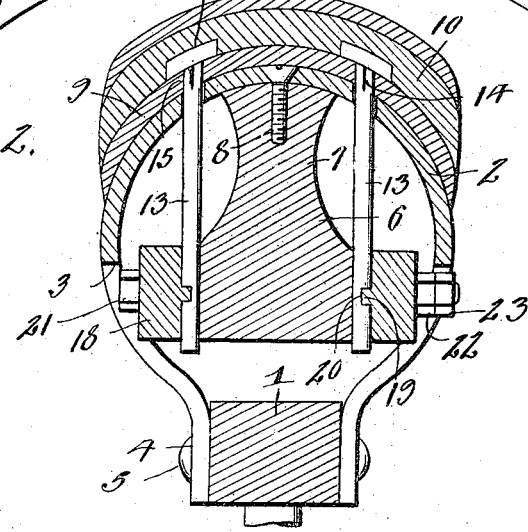
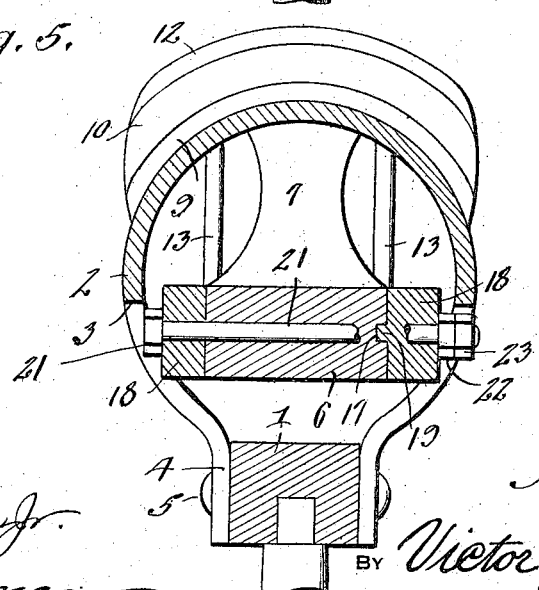
INVENTOR
A. Vanblom,
BY Victor J. Evans
ATTORNEY
WITNESSES

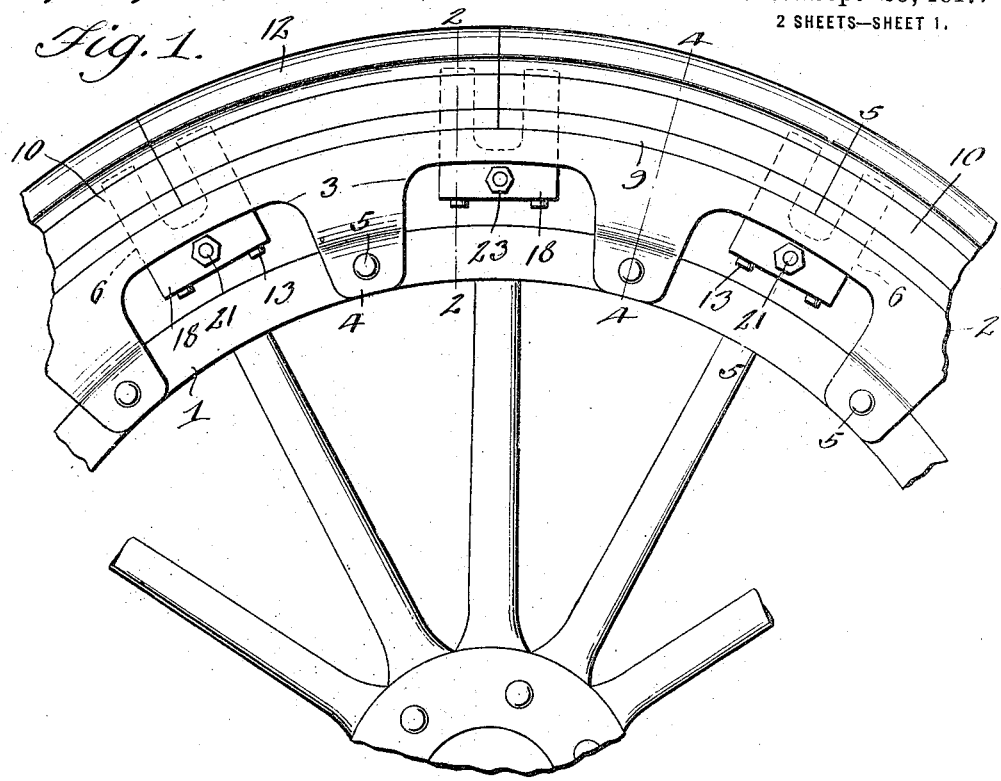
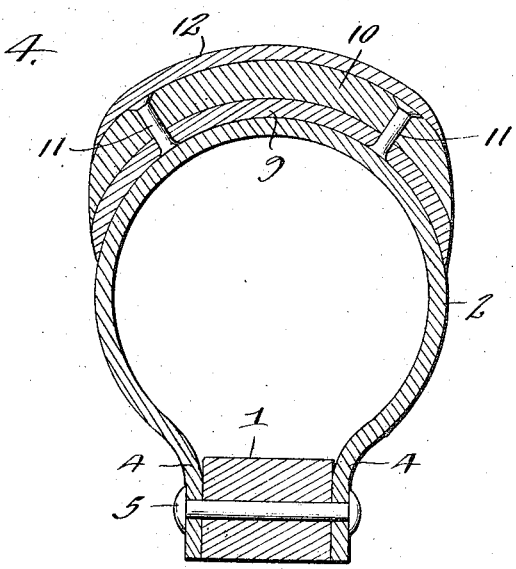

UNITED STATES PATENT OFFICE.

ALBERT VANBLOM, OF ROCKFORD, ILLINOIS.

SPRING-TIRE.

1,241,453. Specification of Letters Patent. Patented Sept. 25, 1917.

Application filed April 24, 1917. Serial No. 164,192.

*To all whom it may concern:*

Be it known that I, ALBERT VANBLOM, a citizen of the United States, residing at Rockford in the county of Winnebago and State of Illinois, have invented new and useful Improvements in Spring-Tires, of which the following is a specification.

This invention is an improved spring tire for use on an automobile wheel to provide a tire having resilient properties which serve to cushion the wheel and absorb shocks and which tire may be used instead of a pneumatic and which secures all the advantages of a pneumatic tire and is free from the disadvantages thereof.

The object of the invention is to provide an improved tire of this kind which is simple in construction, which may be readily placed on or removed from a wheel and which also embodies detachable segment plates provided with cushioning elements and means to secure the segment plates and permit the ready attachment thereof and also embodies means to secure the cushioning elements on the segment plates and permit the removal of said cushioning elements when the same become worn.

The invention consists in the construction, combination and arrangement of devices hereinafter described and claimed.

In the accompanying drawings:—

Figure 1 is an elevation of a portion of an automobile wheel provided with a spring tire constructed and arranged in accordance with my invention.

Fig. 2 is a transverse sectional view of the same on the plane indicated by the line 2—2 of Fig. 1.

Fig. 3 is a longitudinal sectional view of the same.

Fig. 4 is a transverse sectional view on the plane indicated by the line 4—4 of Fig. 1.

Fig. 5 is a similar view on the plane indicated by the line 5—5 of Fig. 1.

The usual wooden felly of an automobile wheel is indicated at 1. My improved spring tire 2 is tubular, in cross section, and open on the inner side and is of suitable thickness and extends entirely around the wheel and its opposite sides are scalloped in form to provide recesses 3 and radially arranged tongues or members 4 between said recesses and which tongues or members bear against opposite sides of the felly and are secured thereto by rivets or bolts 5 which pass through registering openings with which said tongues and the felly are provided.

Blocks 6, of which a suitable number is provided, are arranged in the tire 2 and are provided with arms 7 which bear and set against the inner peripheral portion of the tire and are secured thereto by screws 8. Said blocks 6 may be made of iron, steel or other suitable material.

I also provide segmental plates 9 which are substantially semi-tubular and which are detachably secured on the outer periphery of the tire. The said plates are preferably made of steel but may be made of any suitable resilient material. On the outer side of each segmental plate 9 is a correspondingly shaped cushioning element 10 which is preferably made of leather but which may be made of any suitable material. Said cushioning elements are secured on the plates 9 by rivets 11. Outer or tread cushioning members 12 which are preferably made of leather about one-eighth of an inch thick are glued or cemented on the sides or tread portions of the cushioning elements 10 and cover the heads of the rivets 11.

The said segment plates meet at points midway between the bolts 5 and opposite the centers of the blocks 6 and are detachably secured on the tire by pairs of pins 13 which are arranged near the ends of said segment plates and have non-circular portions 14 which pass through and fit in correspondingly shaped openings 15 in the segment plates and heads 16 which bear on the outer sides of the segment plates and are embedded in the cushioning members 10. Each block 6 is provided in opposite sides with semi-circular openings to receive the pins 13 and are also provided in their opposite sides with grooves 17. Locking bars 18 are arranged on opposite sides of the blocks 6 and have semi-circular openings in their inner sides to receive the pins 13 and are also provided with tongues 19 to engage in the grooves 17 of the blocks and also engage in grooves or notches 20 in the outer sides of the pins. Said locking bars are securely clamped to the blocks and in engaged position with respect to the blocks and the pins by means of bolts 21 which pass through openings in the blocks and locking bars, the said bolts being provided with nuts 22 to bear against the outer sides of said locking bars and also with locking nuts 23 to bear against the outer sides of the nuts 22. The blocks 6 coact with the pins 13 as securing means for the segment plates.

It will be understood that the segment plates with their cushioning elements can be removed from the tire by first loosening the nuts and locking nuts and disengaging the locking bars from the blocks and the notches of the pins 13.

The removable segment plates add greatly to the strength of the tire and also permit the renewal of the outer cushioning members 12 or the cushioning members 10 as may be required.

While I have herein shown and described a preferred form of my invention I would have it understood that changes may be made in the form, proportion and construction of the several parts, without departing from the spirit of my invention and within the scope of the appended claims.

Having thus described my invention, I claim:—

1. A hollow tire of resilient metal having spaced radial tongues at its sides to engage opposite sides of a wheel felly, blocks arranged and secured in the tire, segmental plates on the tire and having cushioning members on their outer sides, pins extending inwardly from said plates through openings in the tire and means to detachably secure said pins to said blocks.

2. A hollow tire of resilient metal having spaced radial tongues at its sides to engage opposite sides of a wheel felly, blocks arranged and secured in the tire, segmental plates on the tire and having cushioning members on their outer sides, pins extending inwardly from said plates through openings in the tire, means to detachably secure said pins to said blocks, said securing means comprising locking bars to engage said pins and blocks and means to detachably secure said locking bars to the blocks.

3. A hollow tire of resilient metal having spaced radial tongues at its sides to engage opposite sides of a wheel felly, blocks arranged and secured in the tire, segmental plates on the tire and having cushioning members on their outer sides, pins extending inwardly from said plates through openings in the tire, means to detachably secure said pins to said blocks, said securing means comprising locking bars to engage said pins and blocks, means to detachably secure said locking bars to the blocks, said blocks and pins having grooves and said locking bars having tongues to engage in the grooves of the blocks and pins.

4. A hollow tire of resilient metal having spaced radial tongues at its sides to engage opposite sides of a wheel felly, blocks arranged in and secured to the tire and bearing against the inner periphery thereof, segmental plates on the tire and securing means for said segmental plates, said securing means extending through the tire and being attached to said blocks.

In testimony whereof I affix my signature.

ALBERT VANBLOM.

Copies of this patent may be obtained for five cents each, by addressing the "Commissioner of Patents, Washington, D. C."